United States Patent [19]
Lin et al.

[11] Patent Number: 5,936,747
[45] Date of Patent: Aug. 10, 1999

[54] CASSETTE SCANNING SYSTEM

[75] Inventors: John Lin; Yen-Hao Chen, both of Hsinchu, Taiwan

[73] Assignee: Mustek Systems Inc., Hsinchu, Taiwan

[21] Appl. No.: 08/790,885

[22] Filed: Feb. 3, 1997

[51] Int. Cl.$^6$ ............................. H04N 1/04; G03G 15/00; G03B 27/62
[52] U.S. Cl. .................. 358/496; 358/474; 358/494; 358/496; 358/473
[58] Field of Search ................................. 358/474, 496, 358/494, 473, 498, 497; 250/239; 235/472

[56]   References Cited

U.S. PATENT DOCUMENTS 5,663,813  9/1997  Pan et al. .................................. 358/474
5,790,278  8/1998  Ehrne et al. ............................. 358/496

Primary Examiner—Thomas D. Lee
Assistant Examiner—Chad J Billings
Attorney, Agent, or Firm—McDermott, Will & Emery

[57]   ABSTRACT

The present invention includes a housing for providing space to hold elements of the scanning system, a document holder is used for holding a document, which can be separated from the scanning system. Further, the document holder consists of a first cover and a second cover. One end of the first cover is connected to one end of the second cover via a pair of pins. The document holder can be pivotally opened for feeding the document into the document holder. A plate having an opening is connected to the housing. The opening is used to provide a path for feeding the document holder into the scanning system. An image capture device is set in the scanning system for capturing the image of the document. A pair of tracks respectively are attached on the inner side walls of the housing for holding the document holder. Document holder rejecting means is utilized for rejecting the document holder.

25 Claims, 3 Drawing Sheets

CASSETTE SCANNING SYSTEM

FIELD OF THE INVENTION

The present invention relates to a scanning system, and more specifically, to a cassette scanning system that can be built in a computer.

BACKGROUND OF THE INVENTION

Conventional scanning system can be approximately divided into two segments that are handy scanning system and flat-bed scanning system. A scanning system makes use of focusing a reflecting light beam through a photodetector to generate an image signal for further image processing. A conventional scanning system apparatus includes a light source, a mirror, and a lens set, which are used to guide the reflecting light to a charge couple device (CCD). The charge couple device is utilized to generate an image signal. A pre-processing element is used to respond an image signal and adjust dc gain of the image signal. An analogue to digital converter is used to convert adjusted image signal to a digital signal and a post-processing element to generate an image code by processing said digital signal through highlight, shadow, and Gamma correction.

Typically, image capture is achieved by passing the document in front of a device known as a CCD. This consists of a large of very small, individual semiconductor receptors, disposed in a linear array. The document is passed in front of the CCD and a complete image of the document linear segments individually captured from the CCD. The CCD consists of a semiconductor material which is formulated to convert incident light into an analogue electrical signal. The signal output by the CCD is subjected to shading correction, bit by bit, thereby providing image data. The shading correction comprises two steps. In the first step, the one-bit pixel data items defining an image are corrected based on the difference between the black reference signal and the white reference signal, thereby forming corrected image data. In the second step, the low frequency distortion and high frequency distortion occurring in the data-reading unit are minimized in accordance with the corrected image data.

In practicing the scanning system, the light source is reflected from the surface of a document, then it is reflected against from the mirror and focused by a lens set. The mirror and the lens set are used to guide the light beam to a CCD. Subsequently, the light beam is converted to an image signal by the CCD, and direct current (d.c.) gain of the image signal is adjusted by a pre-processing element, i.e. a d.c. gain voltage amplifier. Then the adjusted image is fed to an analogue to digital converter (ADC) for converting adjusted image signal to a digital signal. The digital signal is fed to a post-processing element to generate an image code by processing the digital signal through highlight, shadow, and Gamma correction.

However, in conventional scanning apparatus, the document is fed into the scanning apparatus by using rollers, which will cause the document is damaged by the rollers. Therefore, the output quality of the scanning system can not meet the requirement of the present demand. Further, the cost of the conventional scanning apparatus that is built in a computer is high and the structure of the apparatus is also complicated.

SUMMARY OF THE INVENTION

It is an object of the present invention to provide a cassette scanning apparatus that is built in a computer.

It is an another object of the present invention to provide a scanning apparatus having a document holder for holding a document, the document holder can be separated from the scanning apparatus.

The scanning system includes a base housing for providing space to hold elements, circuits of the cassette scanning system. A pair of tracks are respectively attached on the inner side walls of the base housing to hold a document holder. A plate having an opening is connected to the base housing. A rejecting button is attached on the plate. A rejecting element is responsive to the rejecting button to reject the document holder out of the cassette scanning system. A plurality of document holder fixers are set on the base housing, attached on the tracks for filing the document holder while the document holder is fed into the cassette scanning system. An image capture device is set in the cassette scanning system.

The document holder includes a first cover and a second cover. One end of the first cover is connected to one end of the second cover via a pair of pins. The document holder can be pivotally opened in order to feed a document into the document holder. A plurality of indented portions is formed on the side wall of the document holder. At least one of the covers has a plate that is made of transparent material such as glass, acrylic resin for image capture.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention discloses a cassette scanning system that has a document holder for holding a document. The document holder is used to prevent the document from being damaged. Further, the document holder can be separated from the scanning system and the present invention can be built in a computer. Preferably, the cassette scanning system can be set in the space of a computer where used to set a floppy disk driver or a CD driver.

Figure 1:
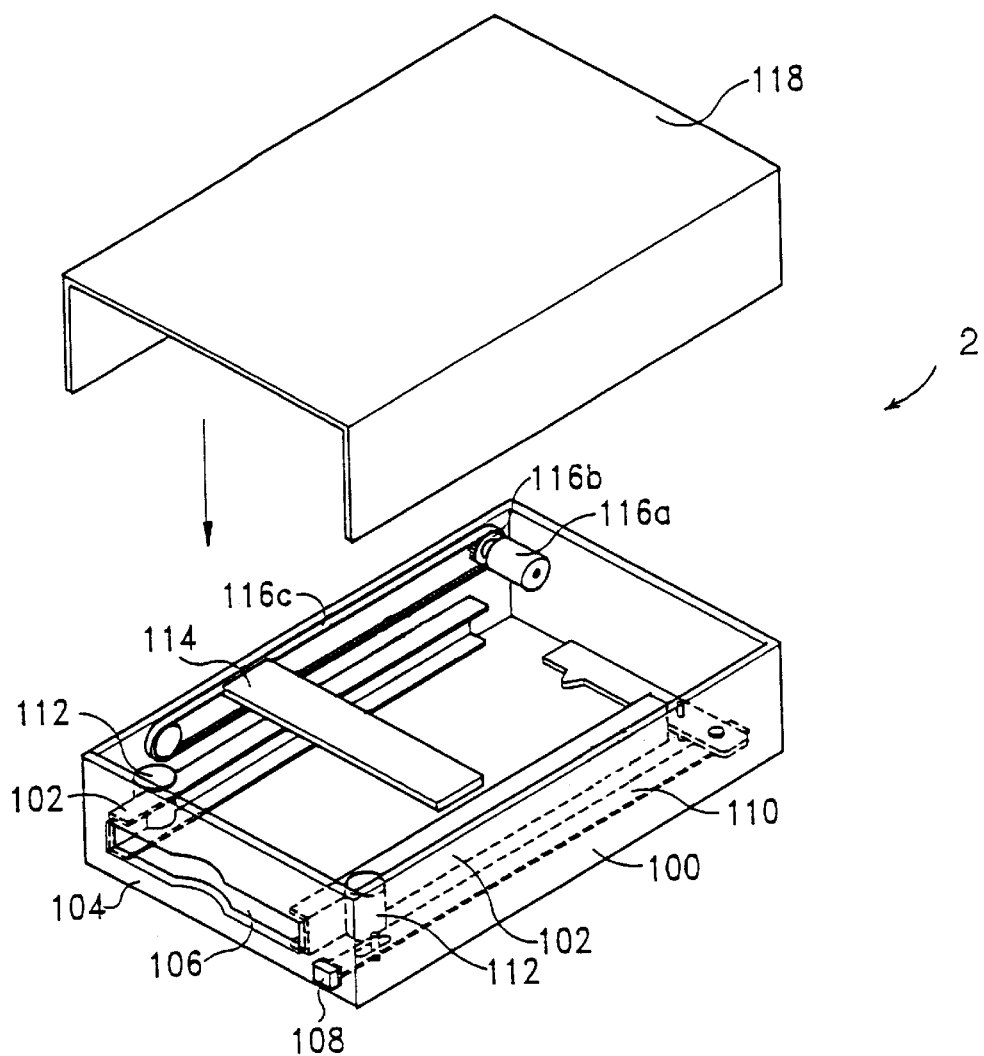
FIG. 1 is a schematic drawing of the present invention.
Figure 2:
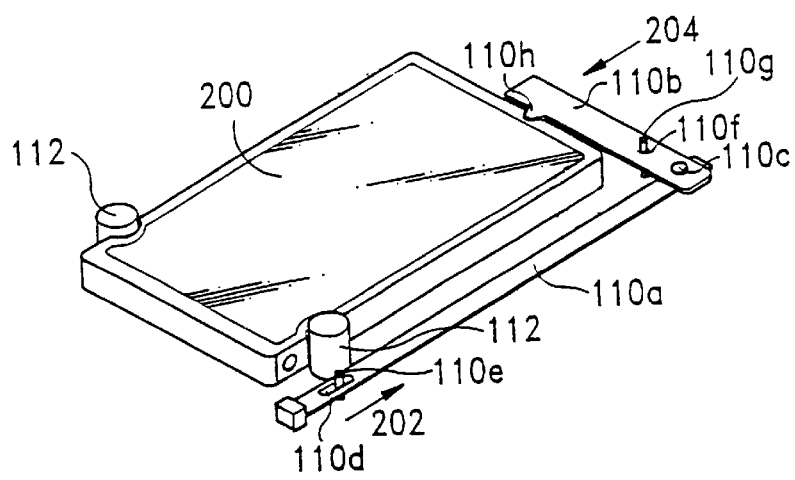
FIG. 2 is a schematic drawing of a document holder and a rejecting element of the present invention.

Turning to FIG. 1 and FIG. 2, the cassette scanning system 2 includes a base housing 100 for providing space to hold elements, circuits of the cassette scanning system 2. A pair of tracks 102 are respectively attached on the inner side walls of the base housing 100 to hold a document holder 200 and provide an orbit therefore the document holder 200 can be linearly moved along the tracks 102. A plate 104 having an opening 106 is connected to and located forehead of the base housing 100. The opening 106 is used to provide a path for feeding the document holder 200 into the cassette scanning system 2.

Referring to FIG. 1 and FIG. 2, a rejecting button 108 is attached on the plate 104. A rejecting element 110 is responsive to the rejecting button 108 to reject the document holder 200 out of the cassette scanning system 2. In a preferably embodiment, rejecting element 110 includes a first link bar 110a is connected to the rejecting button 108 via one termination of the first link bar 110a. A second link bar 110b is pivotally connected to the another termination of the first link bar 110a by using a first pin 110c. Further, a direction fixer is connected to the first link bar 110a to fix the moving direction of the first link bar 110a. Preferably, the direction fixer consists of a second pin 110e that is formed on the base housing 100, and a rectangular opening 110d formed on the first link bar 110a. The second pin 110e passes through the rectangular opening 110d so that the first link bar 110a only moves along one direction marked by an arrow 202. A hole 110f is formed on the one termination of the second link bar 110b adjacent to the connection member 110c. A third pin 110g passes through the hole 110f therefore the second link bar 110b can pivot around the third pin 110f. A protrude portion 110h is formed on the other termination of the second link bar 110b for forcing the document holder 200 to be rejected out of the cassette scanning system 2. It should be note that the present invention can work without the rejecting button 108 and the rejecting element 110. Only if the operator pulls the document holder 200 out of the system by a hand via the opening 106. Further, a top cover 118 is used to cover the cassette scanning system 2.

In practicing the rejection mode, the rejecting button 108 is pushed by an operator, the first link bar 110a subsequently moves along the direction marked by the arrow 202. The second link bar 110b is responsive to the first link bar 110a to force the document holder 200 out of the cassette scanning system 2 in the direction marked by an arrow 204.

Figure 4:
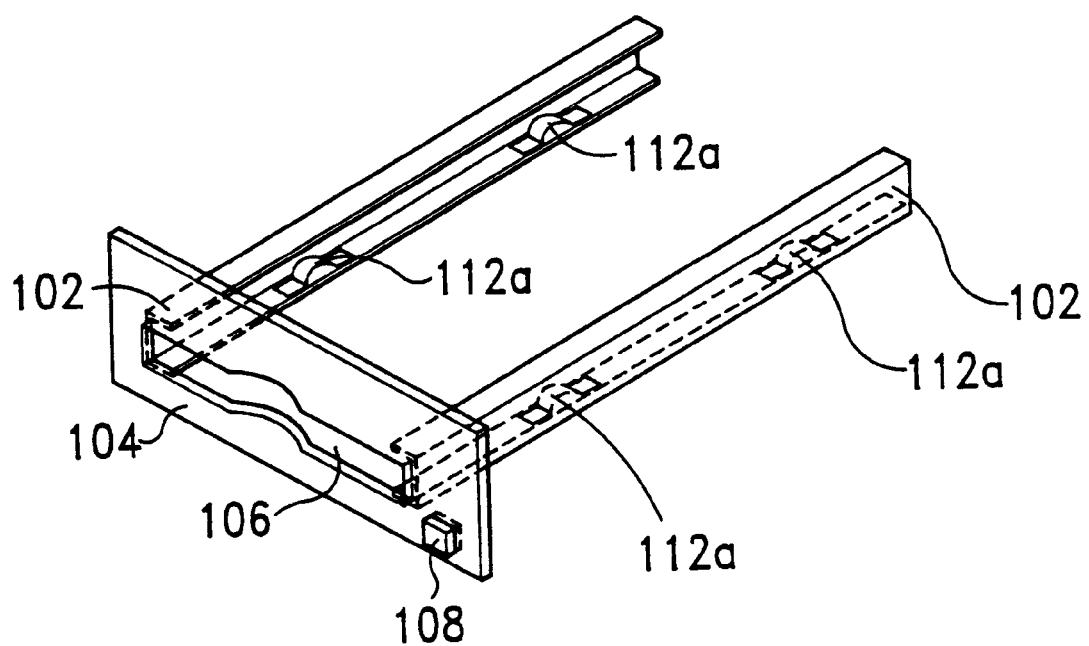
FIG. 4 is a schematic drawing of another embodiment of the document holder fixers of the present invention.

Turning to FIG. 1 and FIG. 2, a plurality of document holder fixers 112 are set on the base housing 100, attached on the tracks 102 for fixing the document holder 200 while the document holder is fed into the cassette scanning system 2. Preferably, the document holder fixer 112 is a rubber cylinder. Alternatively, turning to FIG. 4, a plurality of elastic slices 112a can also be used as the document holder fixers 112. The elastic slices 112a can be set on the tracks 102. The document holder fixers 112 or 112a is set for make sure the document holder 200 will not be moved during the scanning. In other words, the document holder fixers 112a can make sure that the document holder 200 is tightly attached on the tracks 102.

As shown in FIG. 1, an image capture device 114 is set in the cassette scanning system 2. Typically, the image capture device 114 passes in front of the document and a complete image of the document linear segments individually captured by the image capture device 114. The image capture device 114 can be set over or under the document holder 200 depending on the designer. In preferred embodiment, the images capture device 114 is set over the document holder 200, which is driven by driving means. The driving means, in a embodiment, includes a stepping motor 116a, a set of cogwheels 116b and a belt 116c. The images capture device 114 can be driven by the driving means to move back and forth over or under the document holder 200 for capturing the image of the document. Preferably, a contact image sensor (CIS) serves the image capture device 114. Alternatively, a charge couple device (CCD) can also be used to act the image capture device 114. A lens set, a mirror and a light source are also need for the arrangement. The advantage of using the CIS is that the optical path of the CIS is shorter than the one of the CCD. Further, the space where is occupied by the CIS is smaller than the one of the CCD. Therefore, the CIS has the advantage for scaling down the size of the scanning system.

Figure 3:
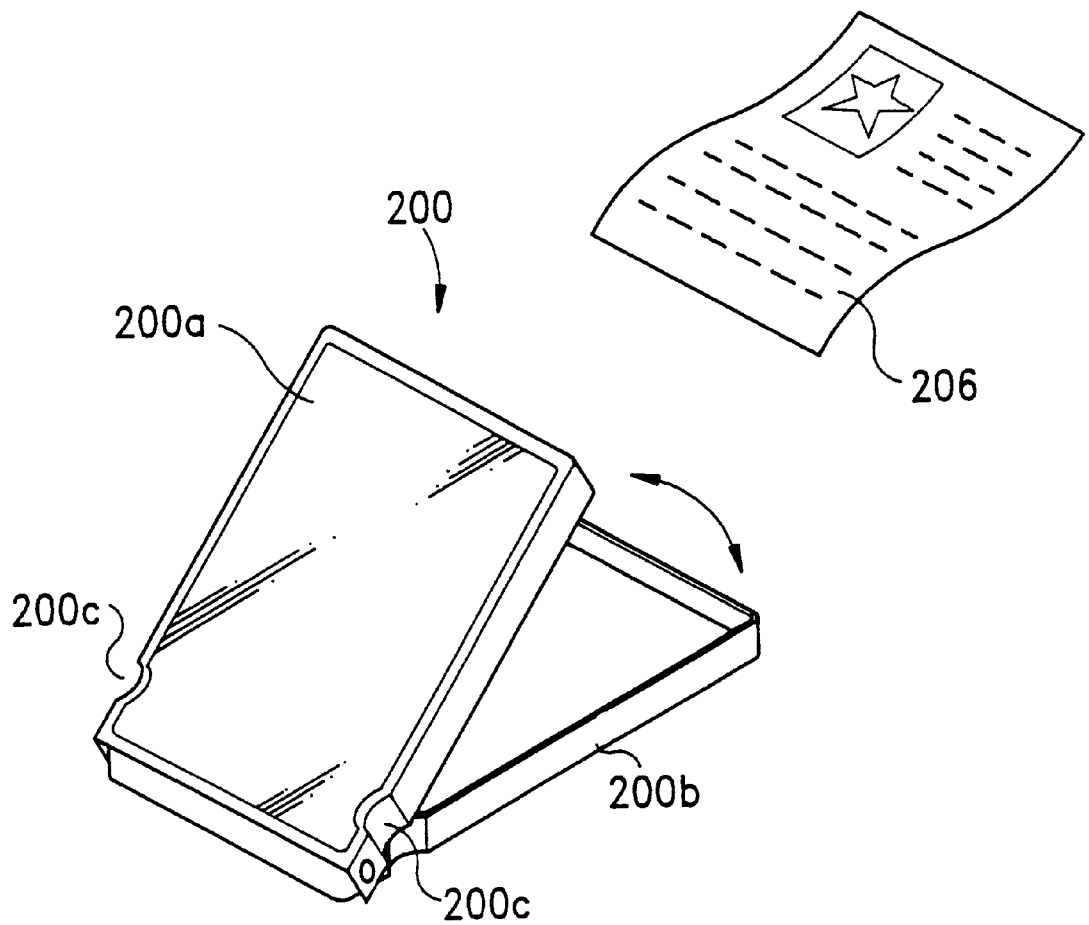
FIG. 3 is a schematic drawing of the document holder of the present invention.

Turning to FIG. 3, it is a schematic drawing of the document holder 200. The document holder 200 includes a first cover 200a and a second cover 200b. One end of the first cover 200a is connected to one end of the second cover 200b via a pair of pins. The document holder 200 can be pivotally opened in order to put a document 206 into the document holder 200. A plurality of indented portions 200c is formed on the side wall of the document holder 200. The positions where the indented portions 200c are located are correspond to the document holder fixers 112. Further, at least one of the covers 200a, 200b has a plate that is made of transparent material such as glass, acrylic resin. This arrangement is used for the image of the document that can be captured by the CIS or CCD.

In practicing the scanning system, the document 206 is put into the document holder 200. Then, the document holder 200 is closed and subsequently is fed into the cassette scanning system 2. The document holder 200 is then fixed by the document holder fixers 112. A sensor is set in the cassette scanning system 2 to detect the document 206 is in the scanning system 2 or not. If the sensor detects the document is in the scanning system. Subsequently, the scanning system 2 is responsive to the sensor to start the scanning status. The image capture device 114 is driven by a stepping motor 116a to capture the image of the document 206. The image capture device 114 is not only to capture the image but also converts the captured image to an image signal. Subsequently, an image code is generated by a pre-processing element, an analogue to digital converter, and a post-processing element. Then the image code is output to a monitor or an output element and so on. In addition, the present invention can also be electrically connected to a computer via a cable.

The foregoing description of the present invention has been presented for purposes of illustration and description. As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A cassette scanning system that can be built in a computer, said scanning system comprising:

a housing for providing space for holding the elements of said scanning system;

a document holder for holding a document and being separable from said scanning system, said document holder openable for feeding said document into said document holder and said feedable into said scanning system, wherein said document holder is fixed in said housing by document holder fixers during a scanning operation; and image capture means set in said scanning system, and said image capture means being driven by a driven means to move back and forth for capturing the image of said document during the scanning operation.

2. The scanning system of claim 1, wherein said scanning system further comprising:

a pair of tracks respectively attached on the inner side walls of said housing for holding said document holder and providing an orbit therefore said document holder being linearly moved along said tracks.

3. The scanning system of claim 2, wherein said tracks further comprises a plurality of document holder fixers that are formed on said tracks, said document holder fixer being a elastic slice.

4. The scanning system of claim 1, wherein said scanning system further comprising:

a plate having an opening connected to said housing, said opening being used to provide a path for feeding said document holder into said scanning system.

5. The scanning system of claim 1, wherein said scanning system further comprises document holder rejecting means for rejecting said document holder.

6. The scanning system of claim 1, wherein said document holder comprising:

a first cover;

a second cover, one end of said first cover being connected to one end of said second cover via a pair of pins, said document holder can be pivotally opened for feeding said document into said document holder; and a transparent plate in at least one of said first cover and second cover for capturing the image of said document.

7. The scanning system of claim 6, wherein said transparent plate is made of glass.

8. The scanning system of claim 6, wherein said transparent plate is made of acrylic resin.

9. The scanning system of claim 1, wherein said scanning system further comprising:

a plurality of document holder fixers for fixing said document holder while said document holder being fed into said cassette scanning system.

10. The scanning system of claim 9, wherein said document holder fixer is a rubber cylinder set on said housing, attached on said tracks.

11. The scanning system of claim 10, wherein said document holder comprising:

a plurality of indented portions formed on the side walls of said document holder.

12. The scanning system of claim 1, wherein said image capture means is contact image sensor (CIS).

13. The scanning system of claim 1, wherein said image capture means is charge couple device (CCD).

14. The scanning system of claim 13, wherein said scanning system further comprising:

a light source, a mirror and a set of lens.

15. A cassette scanning system that can be built in a computer, said scanning system comprising:

a housing for providing space to hold elements of said scanning system, a document holder for holding a document, said document holder being separable from said scanning system, said document holder comprising a first cover and a second cover, one end of said first cover being connected to one end of said second cover via a pair of pins, said document holder being pivotally openable for feeding said document into said document holder, at least one of said covers having a transparent plate for the image of said document being captured, wherein said document holder is fixed in said housing by document holder fixers during a scanning operation;

a plate having an opening connected to said housing, said opening being used to provide a path for feeding said document holder into said scanning system;

image capture means set in said scanning system, and said image capture means being driven by a driven means to move back and forth for capturing the image of said document during a scanning operation;

a pair of tracks respectively attached on the inner side walls of said housing for holding said document holder and providing an orbit therefor, said document holder being linearly movable along said tracks; and a plurality of document holder fixers for fixing said document holder while said document holder being fed into said cassette scanning system and during the scanning operation.

16. The scanning system of claim 15, wherein said scanning system further comprising:

document holder rejecting means for rejecting said document holder.

17. The scanning system of claim 15, wherein said document holder fixer is a rubber cylinder set on said housing, attached on said tracks.

18. The scanning system of claim 17, wherein said document holder comprising:

a plurality of indented portions formed on said side wall of said document holder.

19. The scanning system of claim 15, wherein said document holder fixer is a elastic slice that is formed on said tracks.

20. The scanning system of claim 15, wherein said transparent plate is made of glass.

21. The scanning system of claim 15, wherein said transparent plate is made of acrylic resin.

22. The scanning system of claim 15, wherein said image capture means is contact image sensor (CIS).

23. The scanning system of claim 15, wherein said image capture means is charge couple device (CCD).

24. The scanning system of claim 23, wherein said scanning system further comprising:

a light source, a mirror and a set of lens.

25. The scanning system of claim 15, wherein said scanning system is connected to a computer via a cable.

\* \* \* \* \*